United States Patent [19]

Larsen et al.

[11] Patent Number: 5,065,562
[45] Date of Patent: Nov. 19, 1991

[54] SEALING AND FASTENING SYSTEM FOR GREENHOUSES

[75] Inventors: Douglas C. Larsen, Milford; Robert A. Vaughan, Dearborn, both of Mich.

[73] Assignee: The Standard Products Company, Cleveland, Ohio

[21] Appl. No.: 471,548

[22] Filed: Jan. 29, 1990

[51] Int. Cl.⁵ .............................................. E04D 3/14
[52] U.S. Cl. ...................................... 52/772; 52/770; 52/774; 52/713; 47/17; 24/16 PB
[58] Field of Search ................. 52/761, 489, 461, 463, 52/464, 713, 778, 780, 770, 772, 774; 47/17; 135/119; 24/16 PB

[56] References Cited

U.S. PATENT DOCUMENTS

| | | | |
|---|---|---|---|
| 1,931,750 | 10/1933 | Blaski | 52/90 |
| 1,932,554 | 10/1933 | McKee | 52/90 |
| 3,264,649 | 8/1966 | White | |
| 3,281,169 | 10/1966 | Houvener | |
| 3,424,178 | 1/1969 | Yazaki | 135/119 |
| 3,785,104 | 10/1974 | Dallen | |
| 3,792,951 | 2/1974 | Meyers | |
| 3,846,951 | 11/1974 | Paull | |
| 3,932,974 | 1/1976 | Wright | |
| 3,938,291 | 2/1976 | Criswell | |
| 4,122,640 | 10/1978 | Commins et al. | |
| 4,439,969 | 4/1984 | Bartlett | 52/461 |
| 4,452,027 | 6/1984 | Desai | |
| 4,505,611 | 3/1985 | Nagashima | 52/489 |
| 4,603,527 | 8/1986 | Vercelletto | |
| 4,608,793 | 9/1986 | Yost et al. | |
| 4,648,735 | 3/1987 | Oddenino | 24/16 PB |
| 4,658,478 | 4/1987 | Paradis | |
| 4,669,688 | 6/1987 | Itoh et al. | |
| 4,705,245 | 11/1987 | Osada | |
| 4,779,828 | 10/1988 | Munch | |
| 4,784,358 | 11/1988 | Kohut | |
| 4,795,116 | 1/1989 | Kohut et al. | |
| 4,821,482 | 4/1989 | Miller | |
| 4,840,345 | 6/1989 | Neil et al. | |

OTHER PUBLICATIONS

Brochure, Lexan Thermoclear Sheet, Greenhouses, General Electric, 5/87.
Brochure, Lexan Thermoclear Sheet, Greenhouses, General Electric, Fabrication, Forming and Installation, 6/88.
Brochure, Cyroflex NoDrip, 1988.
Brochure, Ludy Greenhouse Mfg. Corp.

*Primary Examiner*—John E. Murtagh
*Attorney, Agent, or Firm*—Harness, Dickey & Pierce

[57] ABSTRACT

A sealing and fastening system secures a pair of adjoining panels to a frame structure of a greenhouse. The system includes a coupling having a generally "H" shape and forming a pair of transversely spaced pockets, one edge of each panel being disposed in a corresponding pocket. A fastener operatively engages the coupling and has a wrap adapted to be disposed about a member of the frame structure to secure the coupling to the frame structure.

20 Claims, 3 Drawing Sheets

SEALING AND FASTENING SYSTEM FOR GREENHOUSES

BACKGROUND OF THE INVENTION

1. Field of the Invention

The present invention relates generally to sealing and fastening systems for panels, and more particularly to a sealing and fastening system for panels which form substantially the entire outside wall area of a greenhouse.

2. Description of Related Art

Generally, greenhouses are formed to the traditional quonset design as illustrated in FIG. 1. These type of greenhouses have a supporting frame structure which is covered with large panels made from a transparent material Typically, the supporting frame structure includes a plurality of longitudinally spaced and generally arcuate tubular members known as "hoops". The supporting frame structure also includes a plurality of transversely spaced and longitudinally extending tubular members known as "purlins". The purlins are secured to the hoops on either the interior or exterior surface thereof. The panels are secured to either the hoops or purlins. The panels are made of a transparent and impact resistant polycarbonate material such as LEXAN® sold by the General Electric Company. Typically, these panels have an inner and outer wall spaced by a plurality of longitudinally extending interior walls which are generally perpendicular to the inner and outer walls.

In the past, the panels were connected to the hoops or purlins by a fastening system which used a two-piece aluminum extrusion and fasteners such as screws. Typically, the aluminum extrusion was fastened to either the hoops or purlins and sheet metal screws are driven into the outer wall of two adjoining panels to secure the panels to the aluminum extrusion.

One disadvantage of the above fastening system is that assembly and disassembly of the panels to the supporting structure is slow. Another disadvantage of the above fastening system is that it is complex and costly to manufacture and install. Yet another disadvantage is that the screws put apertures or holes into the panels. This may result in water leaks around the screws when it rains.

SUMMARY OF THE INVENTION

It is, therefore, one object of the present invention to provide an improved sealing and fastening system for greenhouses.

It is another object of the present invention to provide a sealing and fastening system which allows faster assembly and disassembly of the panels to the supporting structure.

It is yet another object of the present invention to provide a sealing and fastening system which is relatively simple and inexpensive to manufacture and install.

It is a further object of the present invention to provide a sealing and fastening system which does not require apertures or holes in the panels.

To achieve the foregoing objects, the present invention is a sealing and fastening system for securing a pair of adjoining panels to a frame structure of a greenhouse. The system includes a coupling having a generally "H" shape and forming a pair of transversely spaced pockets, an edge of each panel being disposed in a corresponding pocket. A fastener operatively engages the coupling and has a wrap adapted to be disposed about a member of the frame structure to secure the coupling to the frame structure.

One advantage of the present invention is that assembly and disassembly of the panels to the supporting frame structure is faster. Another advantage of the present invention is that the sealing and fastening system is relatively simple and inexpensive to manufacture and install. Yet another advantage of the present invention is that screws are eliminated, thereby reducing the possibility of water leakage when it rains. A further advantage of the present invention is that the wrap will conform to many different shapes of hoops or purlins, e.g. round, square, "I" beam, etc.

Other advantages, features and objects of the present invention will be readily appreciated as the same becomes better understood after reading the following description in light of the accompanying drawings.

DESCRIPTION OF THE PREFERRED EMBODIMENT

Figure 1:
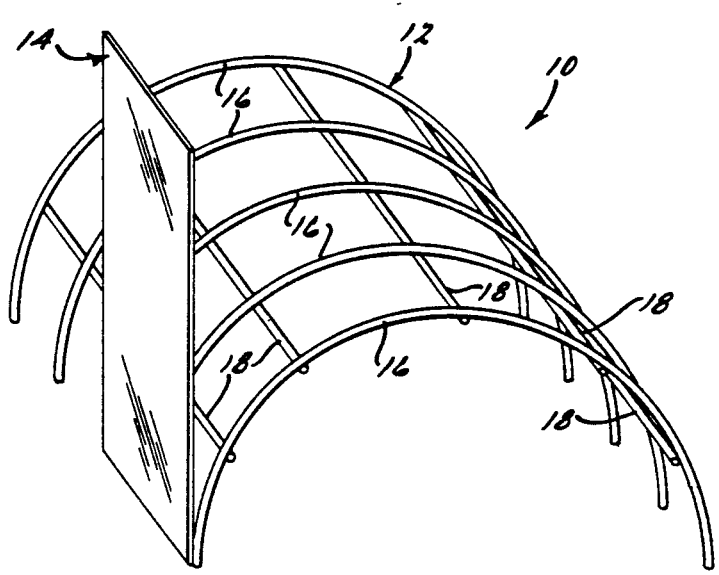
FIG. 1 is a perspective view of a greenhouse having panels and a structure.

Referring to FIG. 1, a greenhouse 10 is shown of a conventional quonset design. The greenhouse 10 includes a supporting frame structure, generally indicated at 12, which is covered with panels, generally indicated at 14. The supporting frame structure 12 includes a plurality of longitudinally spaced and generally arcuate tubular members or hoops 16. The supporting frame structure 12 also includes a plurality of transversely spaced and longitudinally extending tubular members or purlins 18. It should be appreciated that the supporting frame structure 12 could be made from any suitable material to support the load from the panels 14.

Figure 2:
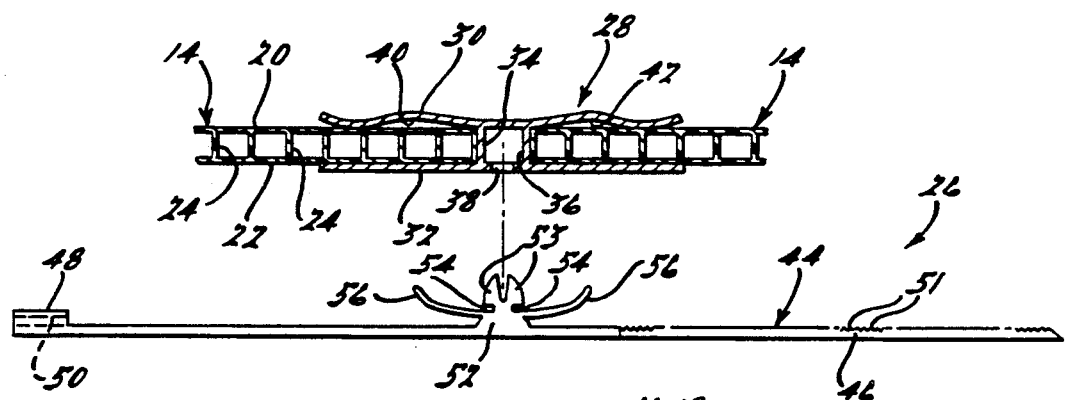
FIG. 2 is an exploded sectional view of a sealing and fastening system according to the present invention for connecting the panels to the supporting frame structure of the greenhouse of FIG. 1.
Figure 2:
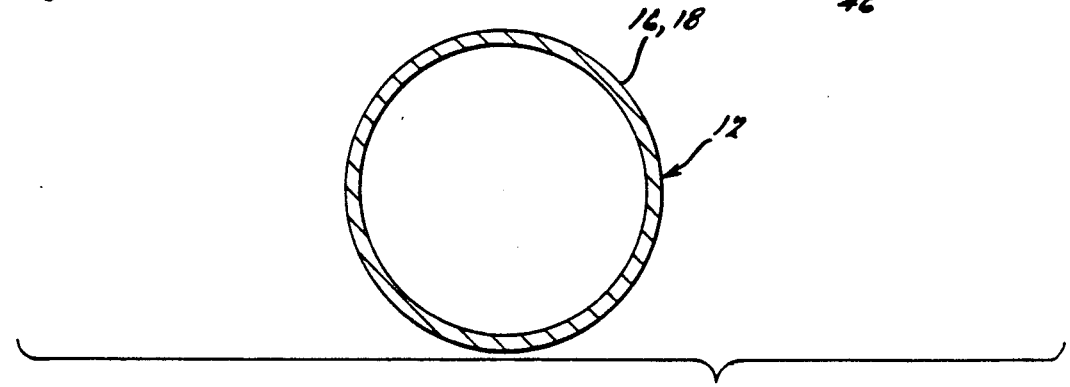

Referring to FIG. 2, the panels 14 are made of a transparent material to allow light such as sunlight to pass therethrough. The transparent material is an impact resistant polycarbonate material such as LEXAN® sold by the General Electric Company of Pittsfield, Mass. The panels 14 are generally planar and have a degree of flexibility to allow them to conform to the arcuate shape of the hoops 16. The panels 14 have an outer and inner wall 20 and 22 spaced by a plurality longitudinally extending interior walls 24 which are generally perpendicular to the outer and inner walls 20 and 22, respectively.

A sealing and fastening system, according to the present invention and generally shown at 26, is used to seal and fasten or connect a pair of adjoining panels 14 to the supporting frame structure 12. The sealing and fastening system 26 includes a coupling, generally indicated at 28, extruded in the form of a letter "H". The coupling 28 is made from a clear or transparent polycarbonate material. The coupling 28 has generally planar and longitudinally extending upper and lower walls 30 and 32, respectively, separated or spaced by a pair of transversely spaced and longitudinally extending interior walls 34 and 36. The lower wall 32 includes a plurality of longitudinally spaced holes or apertures 38 extending therethrough and disposed between the exterior walls 34 and 36. The upper and lower walls 30 and 32 and interior wall 34 form a first pocket 40 and upper and lower walls 30 and 32 and interior wall 36 form a second pocket 42. The edges of two adjoining panels 14 are partially disposed in the pockets 40 and 42 of the coupling 28 and abut the interior walls 34 and 36 as illustrated in FIG. 2.

The sealing and fastening system 26 also includes a fastener, generally indicated at 44, for fastening or securing the coupling 28 to either the hoop 16 or purlin 18. The fastener 44 is of the rosebud type and is made from a nylon material. The fastener 44 has a longitudinally extending planar and flexible band or wrap 46. The wrap 46 has a cross-section typically of 0.186×0.045 inches. The wrap 46 has a buckle 48 at one end with an interior hole 50 which has a width slightly greater than the width of the wrap 46 so that the wrap 46 can extend through it. The wrap 46 has a plurality of parallel lock grooves 51 formed on one side surface to engage the buckle 48. The fastener 44 also has a locking member 52 depending from the wrap 46 and adapted to operatively engage the aperture 38 to secure the fastener 44 to the coupling 28. The locking member 52 includes a pair of projections 53 which are spaced and hinged together at one end to allow relative movement between them. A groove or undercut 54 is formed in the locking member 52 below the projections 53 and has a width slightly greater than the thickness of the lower wall 32 of the coupling 28. The locking member 52 also has a pair of wing portions 56 extending transversely and upwardly.

Figure 3:
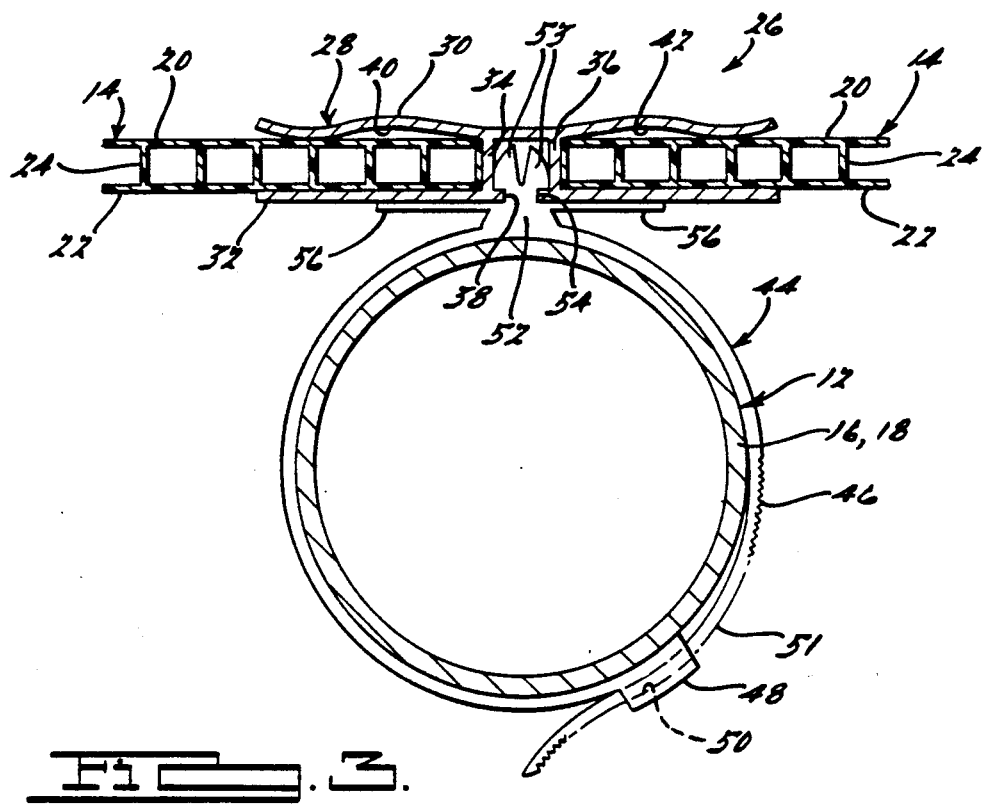
FIG. 3 is a sectional view of the sealing and fastening system of 2 assembled together.

In operation, as illustrated in FIG. 3, the panels 14 are partially disposed in the pockets 40 and 42 of the coupling 28. The projections 53 of the fastener 44 are disposed in the aperture 38 of the lower wall 32 of the coupling 28. The projections 53 flex together upon contacting the edges of the aperture 38 and flex outwardly to their original position once past the aperture 38. The lower wall 32 is then disposed in the grooves 54 of the locking member 52. The wing portions 56 abut the lower wall 32 of the coupling 28. It should be appreciated that the fastener 44 is securely fastened to the coupling 28. To secure the fastener 44 to either the hoop 16 or purlin 18, the wrap 46 is disposed about the circumference thereof and is inserted through the interior hole 50 of the buckle 48. The lock grooves 51 of the wrap 46 engage the buckle 48 such that the wrap 46 is adjustably disposed and retained about either the hoop 16 or purlin 18. The operation of the fastener 44 may be reversed for disassembly.

Figure 4:
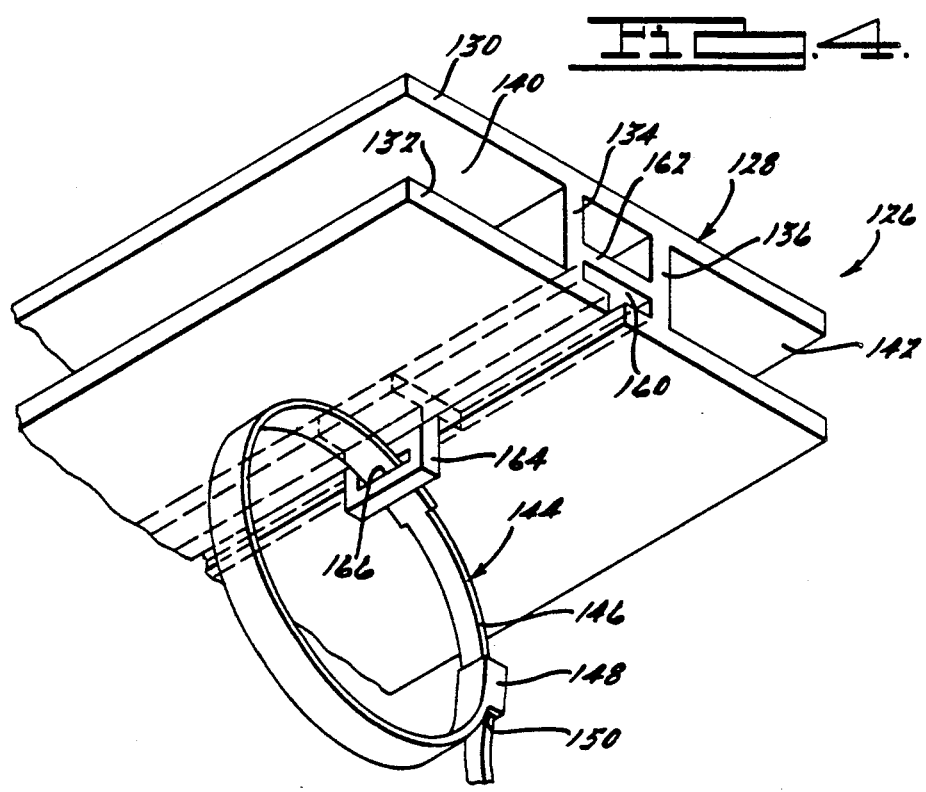
FIG. 4 is a perspective view of a first alternate embodiment of the sealing and fastening system of FIGS. 2 and 3.

Referring to FIG. 4, a first alternate embodiment 126 of the sealing and fastening system 26 is shown. Like parts have like numerals increased by one hundred (100). The coupling 128 has a slot 160 replacing the apertures 38. The slot 160 extends longitudinally in the lower wall 132 between interior walls 134 and 136. A generally horizontal support wall 162 is spaced above the lower wall 132 between the interior walls 134 and 136 to define a generally rectangular shaped channel 161. A generally "T"-shaped locking member 164 cooperates with the slot 160 and channel 161 to allow longitudinal adjustment of the fastener 144. The locking member 164 has a generally horizontal head portion 165 which is disposed in the channel 161 and travels therealong. The head portion 165 has a length greater than its width. The locking member 164 also has a generally vertical body portion 166 which is substantially perpendicular to the head portion 165. The body portion 166 has a rectangular aperture 168 extending transversely therethrough. The body portion 166 extends through the slot 160 such that the aperture 168 is spaced from the outer surface of the lower wall 132. The wrap 146 extends through the aperture 168.

In operation, the panels 14 are partially disposed in the pockets 140 and 142 of the coupling 128. The head portion 165 of the locking member 164 is disposed or inserted into the channel 161 such that the body portion 166 extends through the slot 160. The locking member 164 is moved along the channel 161 and slot 160 to a desired position. The wrap 146 is inserted or extended through the aperture 168 of the locking member 164 and adjustably retained about either the hoop 16 or purlin 18.

Figure 5:
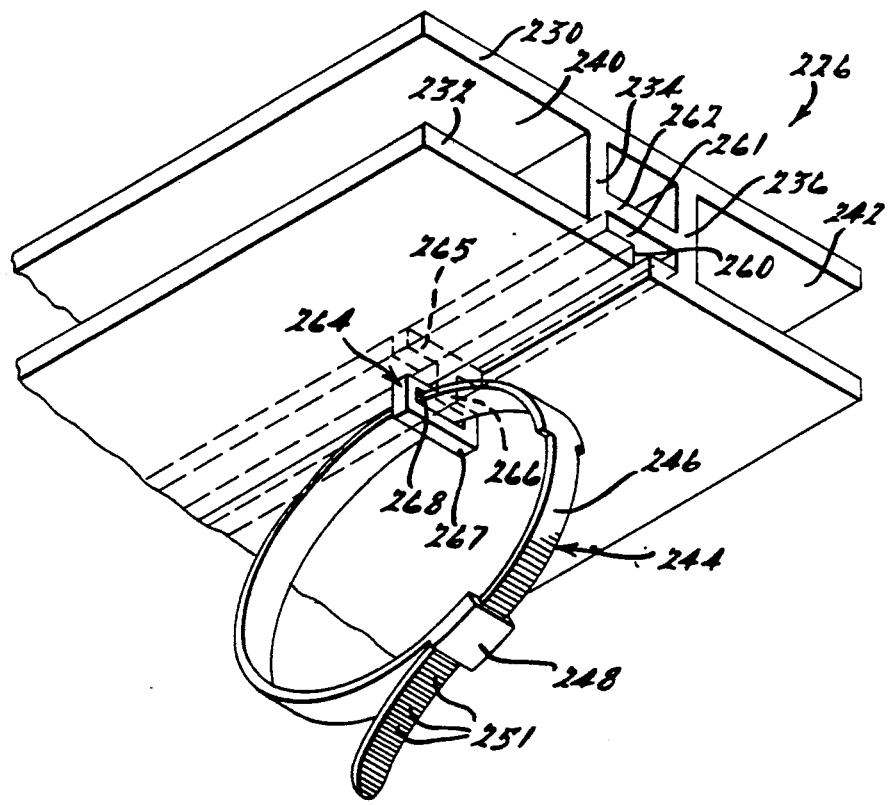
FIG. 5 view similar to FIG. 4 of a second alternate embodiment of and fastening system.

Referring to FIG. 5, a second alternate embodiment 226 of the sealing and fastening system 26 is shown. Like parts of the sealing and fastening system 28 have like numerals increased by two hundred (200). The sealing and fastening system 226 is similar to the sealing and fastening system 126 except for the locking member. The locking member 264 is generally "I"-shaped and cooperates with the slot 260 and channel 261 to allow longitudinal adjustment of the fastener 244 along the coupling 228. The locking member 264 has the generally horizontal head portion 265. However, the head portion 265 has a width greater than its length. The locking member 264 also has the generally vertical body portion 266 which extends through the slot 260. Additionally, the locking member 264 has a generally horizontal end portion 267 at the end of the body portion 266 and spaced from the outer surface of the lower wall 232. The end portion 267 has a width greater than its length. The end portion 267 also has the rectangular aperture 268 extending longitudinally therethrough. The wrap 246 extends through the aperture 268. The operation of the sealing and fastening system 226 is similar to that of the sealing and fastening system 126.

Figure 6:
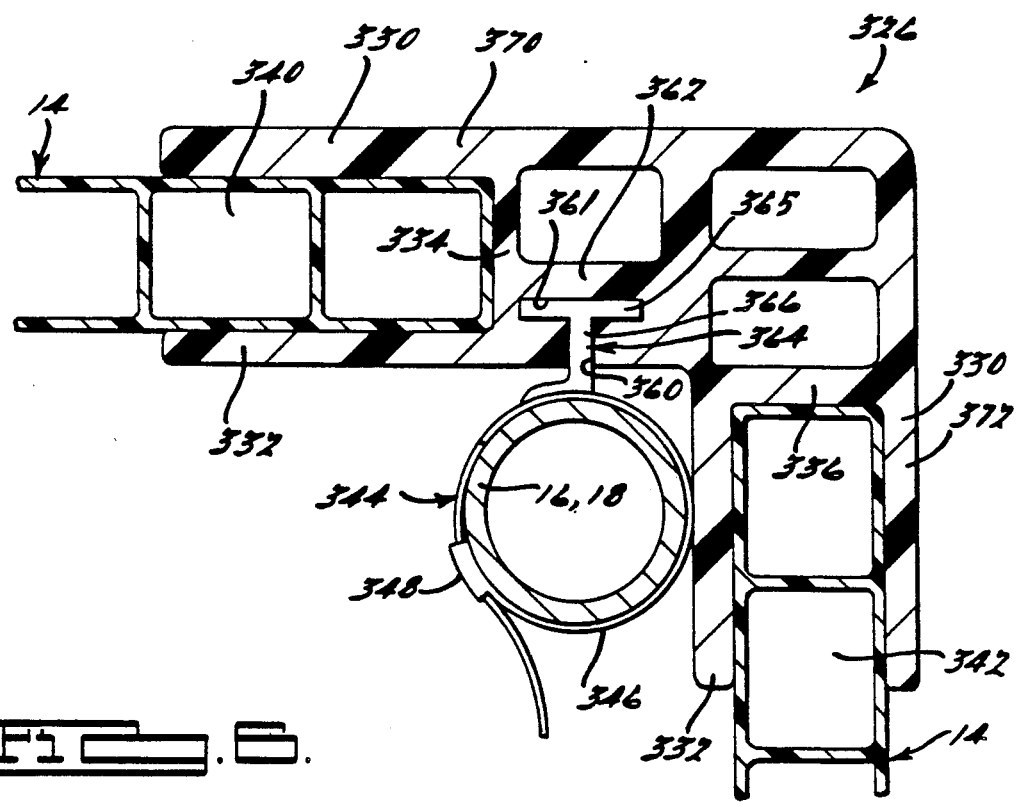
FIG. 6 is a sectional view of a third alternate embodiment of the sealing and fastening system of FIGS. 2 and 3.

Referring to FIG. 6, a third alternate embodiment 326 of the sealing and fastening system 26 is shown. Like parts of the sealing and fastening system 26 have like numerals increased by three hundred (300). The sealing and fastening system 326 includes a coupling, generally indicated at 328. The coupling 328 is extruded in the form of a letter "L" to join adjacent panels 14 to form a corner. The coupling 328 has a first leg 370 extending generally horizontally and a second leg 372 extending generally vertically. Preferably, the first and second legs 370 and 372 are integral. The first and second legs 370 and 372 have generally planar and longitudinally extending upper and lower walls 330 and 332, respectively, separated and spaced by interior walls 335 and 336. The first leg 370 has a first pocket 340 formed by walls 330, 332 and 334 and the second leg 372 has a second pocket 342 formed by walls 330, 332 and 336. The edges of two adjoining panels 14 forming a corner are partially disposed in the pockets 340 and 342 of the coupling 328 and abut interior walls 334 and 336 as illustrated in FIG. 6. The first leg 370 has a slot 360 extending longitudinally in the lower wall 332 between the interior wall 334 and the lower wall 332 of the second leg 372. A generally horizontal support wall 362 is spaced above the lower wall 332 to define a generally rectangularly shaped channel 361. The locking member 364 and fastener 344 are similar to the locking member 124 and fastener 144 of FIG. 4. The operation of the sealing and fastening system 326 is similar to that of FIG. 4.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced otherwise than as specifically described.

What is claimed is:

1. A sealing and fastening system for securing a pair of adjoining panels to a frame structure for a greenhouse, comprising:
   an extruded one-piece coupling having a generally "H"-shape and forming a pair of transversely spaced pockets, one edge of each panel being disposed in a corresponding pocket; and
   a fastener operatively engaging said coupling and having a wrap adapted to be disposed about a member of the frame structure to secure said coupling to the frame structure, said wrap including a self contained fastening means for securing of the wrap to the frame structure.

2. A sealing and fastening system as set forth in claim 1 wherein said coupling includes a plurality of spaced apertures formed therein.

3. A sealing and fastening system as set forth in claim 2 wherein said fastener includes a locking member depending from said wrap adapted to engage said apertures to secure said fastener to said coupling.

4. A sealing and fastening system for securing a pair of adjoining panels to a frame structure for a greenhouse, comprising:
   a coupling having a generally "H"-shape and forming a pair of transversely spaced pockets, one edge of each panel being disposed in a corresponding pocket; and
   a fastener operatively engaging said coupling and having a wrap adapted to be disposed about a member of the frame structure to secure said coupling to the frame structure;
   said coupling including a plurality of spaced apertures;
   said fastener including a locking member depending from said wrap adapted to engage said apertures to secure said fastener to said coupling; and
   said locking member including a pair of projections which are spaced and hinged together at one end to allow relative movement therebetween.

5. A sealing and fastening system as set forth in claim 4 including a groove formed in the locking member below said projections and having a width greater than the thickness of said coupling.

6. A sealing and fastening system as set forth in claim 1 wherein said coupling includes a slot extending longitudinally therealong.

7. A sealing and fastening system as set forth in claim 6 wherein said coupling includes first and second walls and interior walls interconnecting and spacing said first and second walls from each other.

8. A sealing and fastening system as set forth in claim 7 wherein said interior walls define a channel which communicates with said slot.

9. A sealing and fastening system as set forth in claim 8 including a locking member which operatively cooperates with said slot and said channel to adjust said locking member at various positions along said coupling.

10. A sealing and fastening system as set forth in claim 9 wherein said locking member has a head portion adapted to be disposed in said channel and a body portion extends through said slot.

11. A sealing and fastening system as set forth in claim 10 wherein said body portion includes means forming an aperture extending therethrough, said wrap being extended through said aperture.

12. A sealing and fastening system as set forth in claim 10 wherein said locking member includes an end portion at one end of said body portion and including means forming an aperture extending therethrough, said end portion having a width greater than the width of said body portion.

13. A sealing and fastening system for securing a pair of adjoining panels to a frame structure for a greenhouse, comprising:
   a coupling having a generally "H"-shape and forming a pair of transversely spaced pockets, one edge of each panel being disposed in a corresponding pocket; and
   a fastener operatively engaging said coupling and having a wrap adapted to be disposed about a member of the frame structure to secure said coupling to the frame structure;
   said coupling including a plurality of spaced apertures;
   said fastener including a locking member depending from said wrap adapted to engage said apertures to secure said fastener to said coupling;
   said wrap having a buckle at one end and including means to adjustably retain said wrap to a member of the frame structure.

14. A sealing and fastening system for securing a pair of adjoining panels to a frame structure for a greenhouse, comprising:
   a coupling having a pair of transversely spaced pockets, one edge of each panel being disposed in a corresponding pocket; and
   a fastener operatively engaging said coupling and having a wrap adapted to be disposed about a member of the frame structure to secure said coupling to the frame structure;
   said coupling includes a slot extending longitudinally therethrough;
   said coupling includes first and second walls and interior walls interconnecting and spacing said first and second walls from each other;
   said coupling is generally L-shaped and has first and second legs forming a corner.

15. A sealing and fastening system for securing a pair of adjoining panels to a frame structure for a greenhouse, comprising:
   a coupling having a generally "H"-shape and forming a pair of transversely spaced pockets, one edge of each panel being disposed in a corresponding pocket;

a fastener operatively engaging said coupling and having a wrap adapted to be disposed about a member of the frame structure to secure said coupling to the frame structure;

said coupling including a plurality of spaced apertures formed therein;

said fastener including a locking member depending from said wrap adapted to engage said apertures to secure said fastener to said coupling;

said locking member including a pair of projections which are spaced and hinged together at one end to allow relative movement therebetween;

said locking member including means forming a groove in the locking member below said projections and having a width greater than the thickness of said coupling; and a wrap having a buckle at one end and including means to adjustably retain said wrap to a member of the frame structure.

16. A sealing and fastening system for securing a pair of adjoining panels to a frame structure for a greenhouse, comprising:

a coupling having a generally "H"-shape and forming a pair of transversely spaced pockets, one edge of each panel being disposed in a corresponding pocket;

a fastener operatively engaging said coupling and having a wrap adapted to be disposed about a member of the frame structure to secure said coupling to the frame structure;

said coupling including means forming a slot extending therealong;

said coupling including first and second walls and interior walls interconecting and spacing said first and second walls from each other;

said interior walls defining a channel which communicates with said slot;

a locking member which operatively cooperates with said slot and said channel to adjust said locking member at various positions along said coupling;

said locking member having a head portion adapted to be disposed in said channel and a body portion extending through said slot; and said body portion including means forming an aperture extending therethrough, said wrap being extended through said aperture.

17. A sealing and fastening system for securing a pair of adjoining panels to a frame structure for a greenhouse, comprising:

a coupling having a generally "H"-shape and forming a pair of transversely spaced pockets, one edge of each panel being disposed in a corresponding pocket;

a fastener operatively engaging said coupling and having a wrap adapted to be disposed about a member of the frame structure to secure said coupling to the frame structure;

said coupling including means forming a slot extending longitudinally therealong;

said coupling including first and second walls and interior walls interconnecting and spacing said first and second walls from each other;

said interior walls defining a channel which communicates with said slot;

a locking member which operatively cooperates with said slot and said channel to adjust said locking member at various positions along said coupling;

said locking member having a head portion adapted to be disposed in said channel and a body portion extending through said slot; and said locking member including an end portion at one end of said body portion and including means forming an aperture extending therethrough, said end portion having a width greater than the width of said body portion.

18. A sealing and fastening system for securing a pair of adjoining panels to a frame structure for a greenhouse, comprising:

a coupling having a generally "H"-shape and forming a pair of transversely spaced pockets, one edge of each panel being disposed in a corresponding pocket;

a fastening operatively engaging said coupling and having a wrap adapted to be disposed about a member of the frame structure to secure said coupling to the frame structure;

said coupling including means forming a slot extending longitudinally therealong;

said coupling including first and second walls and interior walls interconnecting and spacing said first and second walls from each other;

said interior walls defining a channel which communicates with said slot;

a locking member which operatively cooperates with said slot and said channel to adjust said locking member at various positions along said coupling;

said locking member having a head portion adapted to be disposed in said channel and a body portion extending through said slot;

said body portion including means forming an aperture extending therethrough, said wrap being extended through said aperture; and said coupling being generally L-shaped and having first and second legs forming a corner.

19. A sealing and fastening system for securing a pair of adjoining panels to a frame structure for a greenhouse, comprising:

a coupling having a generally "H"-shape and forming a pair of transversely spaced pockets, one edge of each panel being disposed in a corresponding pocket; and means operatively engaging said coupling and adapted to be disposed about a member of the frame structure to secure said coupling to the frame structure, said means including a self contained fastening system such that said coupling may be adjustably fastened to itself for securement about the member of the frame structure.

20. A sealing and fastening system as set forth in claim 19 wherein said means includes a wrap adapted to be disposed about the member and a locking member depending from said wrap adapted to engage said coupling to secure said fastener to said coupling.

* * * * *

UNITED STATES PATENT AND TRADEMARK OFFICE
CERTIFICATE OF CORRECTION

PATENT NO. : 5,065,562

DATED : November 19, 1991

INVENTOR(S) : Douglas C. Larsen et al

It is certified that error appears in the above-identified patent and that said Letters Patent is hereby corrected as shown below:

On The Title Page - U.S. Patent Documents, 3,785,104: "10/1974" should be -- 1/1974--

Column 1, line 14, "type" should be --types--

Column 1, line 17, "material" should be --material.--

Column 2, line 24, before "structure" insert --supporting frame--

Column 2, line 30, "2" should be --FIG. 2--

Column 2, line 34, after "Figure 5" insert --is a--

Column 2, line 35, after "of" insert -- the sealing--

Column 7, line 36, claim 16, after "extending" insert --longitudinally--

Column 8, line 24, claim 18 "fastening" should be --fastener--

Signed and Sealed this

Third Day of August, 1993

*Attest:*

MICHAEL K. KIRK

*Attesting Officer*     Acting Commissioner of Patents and Trademarks